(12) United States Patent
Robledo (10) Patent No.: US 8,371,006 B2
(45) Date of Patent: Feb. 12, 2013

(54) ROTARY MECHANICAL VIBRATION MECHANISM

(75) Inventor: Jaime Robledo, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 805 days.

(21) Appl. No.: 12/405,606

(22) Filed: Mar. 17, 2009

(65) Prior Publication Data

US 2010/0236039 A1 Sep. 23, 2010

(51) Int. Cl.
| A61B 17/00 | (2006.01) |
| A61B 17/04 | (2006.01) |
| A61B 17/10 | (2006.01) |
| B25B 13/00 | (2006.01) |
| B25B 21/00 | (2006.01) |
| B23P 19/04 | (2006.01) |

(52) U.S. Cl. ........... 29/256; 606/1; 227/176.1; 81/52
(58) Field of Classification Search ............. 29/256; 606/1, 86 A, 205, 80, 169; 227/176.1, 175.1; 81/52

See application file for complete search history.

(56) References Cited

U.S. PATENT DOCUMENTS

| 3,682,254 | A | * | 8/1972 | Hoeffleur ................. 173/49 |
| 4,620,539 | A | * | 11/1986 | Andrews et al. ............. 606/180 |
| 4,819,740 | A | * | 4/1989 | Warrington ............... 173/49 |
| 5,649,955 | A | * | 7/1997 | Hashimoto et al. ......... 606/205 |
| 5,776,155 | A | * | 7/1998 | Beaupre et al. ............. 606/169 |
| 5,927,591 | A | | 7/1999 | Goins, III et al. ........... 228/264 |
| 6,854,938 | B2 | * | 2/2005 | Kopras et al. ............... 409/182 |
| 6,872,208 | B1 | * | 3/2005 | McBride et al. ............ 606/86 A |
| 6,887,241 | B1 | * | 5/2005 | McBride et al. ............ 606/86 A |
| 7,066,250 | B2 | | 6/2006 | Webb et al. ................ 166/177.6 |
| 7,326,217 | B2 | | 2/2008 | Bubb ........................ 606/99 |
| 7,441,684 | B2 | * | 10/2008 | Shelton et al. ............. 227/175.1 |
| 7,448,525 | B2 | * | 11/2008 | Shelton et al. ............. 227/176.1 |
| 7,449,342 | B2 | * | 11/2008 | Kane et al. ................. 436/180 |
| 7,493,931 | B2 | | 2/2009 | Deiderich .................. 156/579 |
| 7,743,683 | B2 | * | 6/2010 | Dayton et al. .............. 81/52 |
| 7,744,301 | B2 | * | 6/2010 | Fatemi ....................... 403/322.1 |
| 7,909,365 | B2 | * | 3/2011 | Krywitsky .................. 285/85 |
| 2005/0119666 | A1 | | 6/2005 | Bubb ........................ 606/99 |
| 2007/0205551 | A1 | | 9/2007 | Nukada et al. .............. 271/90 |
| 2008/0029575 | A1 | * | 2/2008 | Shelton et al. ............. 227/176.1 |
| 2008/0300580 | A1 | * | 12/2008 | Shelton et al. ............. 606/1 |

* cited by examiner

*Primary Examiner* — Lee D Wilson
*Assistant Examiner* — Alvin Grant
(74) *Attorney, Agent, or Firm* — Thorpe North & Western LLP (57) ABSTRACT

A system and method for extracting seized components is disclosed. The method further grasping a seized component with a gripping mechanism and securing the gripping mechanism to the seized component by turning a camlock mechanism. A force is applied to a power transfer mechanism that moves a threaded axis that is threaded through the power transfer mechanism. The method additionally includes attaching the threaded axis to the gripping mechanism, which extracts the seized component. To facilitate extraction, the method also includes generating vibrations by a vibration mechanism, which may include a vibration mechanism rotating a rotary plate about a shaft. The method may also include generating vibrations by a cam attached to the rotary plate contacting one or more spring-loaded hammers. The spring-loaded hammers may be capable of impacting a strike plate, generating vibrations.

13 Claims, 5 Drawing Sheets

ROTARY MECHANICAL VIBRATION MECHANISM

TECHNICAL FIELD OF THE INVENTION

This invention relates generally to mechanical extraction of electronic components and more particularly to a method and system for the extraction of antenna elements in an antenna array.

BACKGROUND OF THE INVENTION

In electro-mechanical systems that contain subcomponents, exposure to weather elements can cause various subcomponents to seize to their housings. Particularly problematic are antenna arrays consisting of antenna elements. Antenna arrays are typically exposed to the environment with relatively little protection. Antenna elements and their housings can both be constructed of an aluminum alloy that, when placed in close proximity and exposed to a salt-water atmosphere, can create an aluminum oxide between the element and its housing. This oxidation, combined with natural build-up of particulate matter makes successful damage-free extraction of the antenna elements difficult. Although a protective weather seal may be used to keep moisture and particulate matter out of the interfaces of the elements and housings, the weather seal may break down over time and further contributes to the problem of trapping grime and oxidation. There currently does not exist a reliable, repeatable, quick, simple and effective tool for successful extraction of seized mechanical components.

SUMMARY OF THE INVENTION

The present invention provides a method and system for extracting seized components that substantially reduces or eliminates at least some of the disadvantages and problems associated with previous method of extracting seized components. In particular, a system for extracting seized components is provided that includes a support body, gripping mechanism, a power transfer mechanism, a threaded axis, a shaft, a camlock mechanism, and a vibration mechanism.

In accordance with one embodiment of the present invention, a method for extracting seized components includes connecting a shaft to a camlock mechanism and a gripping mechanism. The method further includes grasping a seized component with the gripping mechanism and securing the gripping mechanism to the seized component by turning the camlock mechanism. Additionally, a force is applied to a power transfer mechanism that moves a threaded axis that is threaded through the power transfer mechanism. The method additionally includes attaching the threaded axis to the gripping mechanism, which extracts the seized component. To facilitate extraction, the method also includes generating vibrations with a vibration mechanism.

The method may include generating vibrations with a vibration mechanism by rotating a rotary plate about a shaft extending through the center of the vibration mechanism, where the shaft is positioned in the center of the rotating plate. The method may also include generating vibrations by a cam attached to the rotary plate contacting one or more spring-loaded hammers. The spring-loaded hammers may be capable of impacting a strike plate, generating vibrations. Additionally, the method may include receiving at a housing the shaft, the rotary plate, the plurality of spring-loaded hammers, and the cam.

In accordance with another embodiment of the present invention, a system for extracting seized components may include a gripping mechanism that attaches to a seized component. The system may additionally include a camlock mechanism attached to the gripping mechanism by a shaft. The camlock mechanism may be capable of moving the gripping mechanism a predetermined distance, thereby fastening the gripping mechanism to the seized component. The system may also include a power transfer mechanism that may be capable of translating a received rotational force to a linear force. The linear force may pull a threaded axis attached to the gripping mechanism outward, thereby extracting the seized component. Additionally, the system may include a vibration mechanism that may be capable of generating vibration that facilitate the extraction of seized components.

Important technical advantages of certain aspects of the present invention include providing a reliable and convenient method of extracting mechanical and electrical components that are seized in their housings. Particular embodiments of system 10 may increase the successful removal rate of seized components by providing aligned, standardized and repeatable extracting forces. In particular embodiments, system 10 provides more contact surface for pulling on a sized component than previous methods. As a result, a user may exert less force on a seized component, thereby increasing the success rate of extraction by limiting the damage caused by brute-force methods. Moreover, system 10 facilitates extraction of seized components by generating vibrations at appropriate points of operation, thereby loosening accumulated particulate matter and oxidation caused by weather elements. Other technical advantages of the present invention will be readily apparent to one skilled in the art from the following figures, description, and claims. Moreover, while specific advantages have been enumerated above, various embodiments may include all, some, or none of the enumerated advantages.

DETAILED DESCRIPTION OF THE INVENTION

Figure 1:
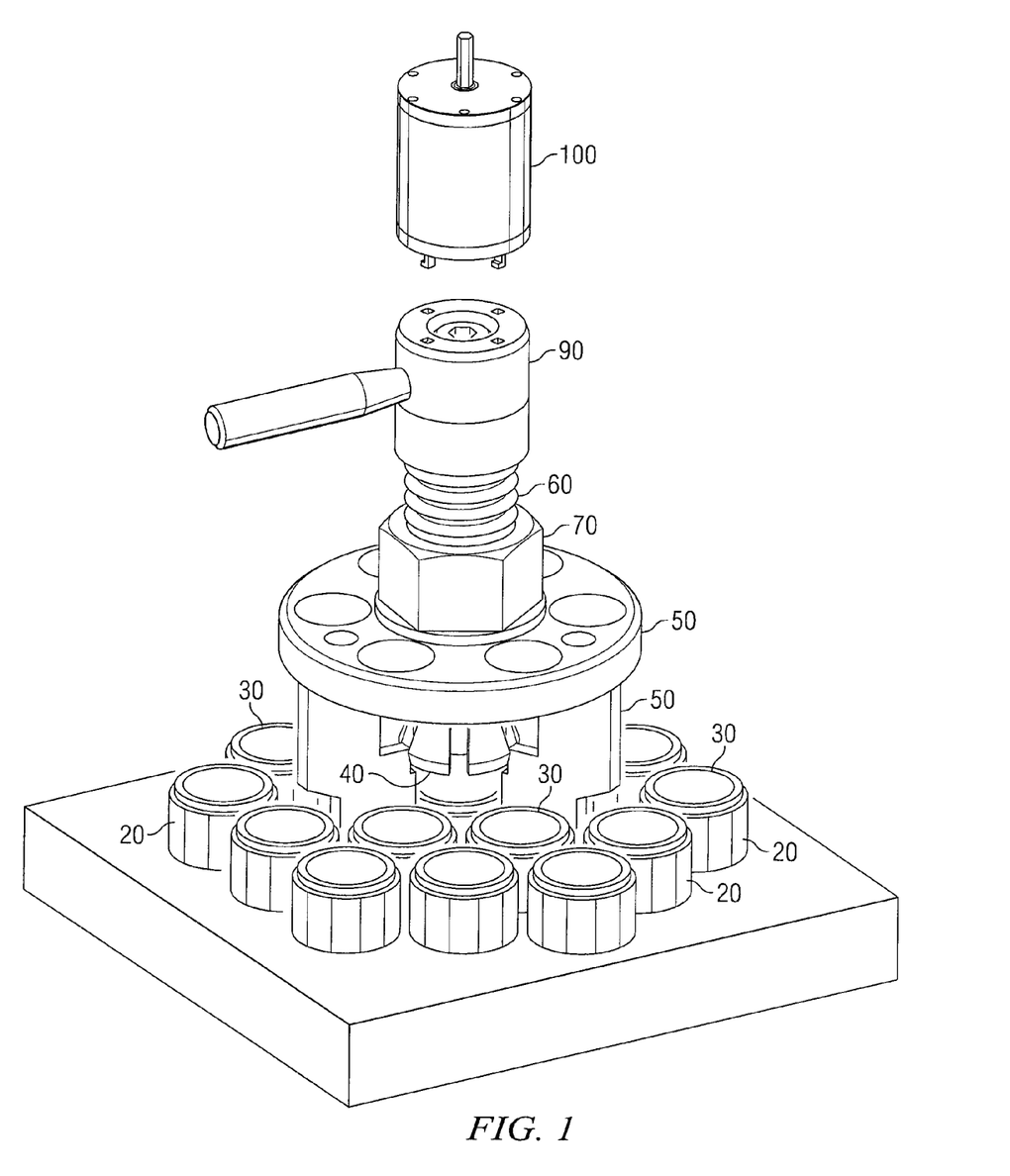
FIG. 1 is a block diagram illustrating an extraction system according to a particular embodiment of the present invention.

FIG. 1 illustrates a particular embodiment of a system 10 for extracting seized components. System 10 includes a camlock mechanism 90, a threaded axis 60, a power transfer mechanism 70, a support body 50, a gripping mechanism 40, a vibration mechanism 100, a seized component 30, and a housing 20. To facilitate the extraction of seized component 30, gripping mechanism 40 may be attached to seized component 30. Camlock mechanism 90 may then be rotated to secure gripping mechanism to seized component 30. Additionally, a user may apply a rotational force to a shaft of vibration mechanism 100 to generate a series of vibrations that loosens seized component 30. Then, a user may apply rotational force to power transfer mechanism 70 attached to support body 50 and threaded onto threaded axis 60. The rotational force is translated to linearly force by the interaction of power transfer mechanism 70 on threaded axis 60, and seized component 30 is extracted.

Housing 20 encloses, in whole or in part, seized component 30. For the purposes of this description, housing 20 may "enclose" a particular seized component 30 by forming a surface that entirely surrounds the relevant seized component 30, or one that partially surrounds a portion of the relevant seized component 30. As a result, in particular embodiments, seized component 30 enclosed by housing 20 may have one or more of their surfaces exposed by housing 20. Housing 20 may represent any appropriate metal or plastic enclosure suitable to perform the described functionality. In particular embodiments of system 10 in which seized component 30 represents an antenna element, housing 20 may represent an appropriately-sized, cylindrically shaped receptacle that receives an antenna element.

Seized component 30 is an electrical or mechanical component that is seized in an enclosure or housing. Seized component 30 may be seized in housing 20 or other enclosure by oxidation, particulate matter, physical wear, or by any other cause. In particular embodiments of system 10, seized component 30 may be an antenna element or a waveguide in an antenna array. In particular embodiments of system 10 in which seized component 30 represents an antenna element, the antenna element may include a recessed cylindrical channel that is exposed when the antenna element is placed in housing 20. The exposed cylindrical channel enables gripping mechanism 40 to securely attach to seized component 30.

Gripping mechanism 40 attaches to seized component 30 to enable a user to extract seized component 30 from housing 20. In particular embodiments, gripping mechanism may be a collet, chuck, or collar, suitable to enclose, in whole or in part, an outer rim of seized component 30. In general, however, gripping mechanism 40 may be any shaped in any appropriate manner suitable to grip seized component 30. In particular embodiments, gripping mechanism 40 may be constructed of a corrosion resistant steel alloy. In general, however, gripping mechanism 40 may be formed from any appropriate metal or plastic material suitable to provide the described functionality.

Support body 50 provides structural support to system 10, facilitates proper alignment with seized component 30, and provides reactionary forces to power transfer mechanism 70. Additionally, support body 50 provides ergonomical handling to a user extracting seized component 30. In particular embodiments support body 50 may be a disk or plate with attached appendages and alignment pins to facilitate alignment with seized component 30. Additionally, support body 50 may be operable to receive threaded axis 60 and power transfer mechanism 70 through the center of support body 50.

Threaded axis 60 is threaded through power transfer mechanism 70 positioned in the center of support body 50, and connects to gripping mechanism 40. Additionally, threaded axis 60 receives camlock mechanism 90. In particular embodiments, threaded axis 60 receives power transfer mechanism 70 and camlock mechanism 90 along the threads of threaded axis 60, thereby may providing structural support to power transfer mechanism 70 and camlock mechanism 90. In particular embodiments, threaded axis 60 may be operable to pull upwards on gripping mechanism 40 as rotational force is applied to power transfer mechanism 70. Additionally, threaded axis 60 may be a threaded screw constructed of aluminum alloy. In general however, threaded axis 60 may be constructed of any appropriate metal or plastic material suitable to provide the described functionality.

Power transfer mechanism 70 is a threaded bolt threaded onto threaded axis 60 and fitted inside support body 50. In particular embodiments, power transfer mechanism 70 is operable to receive a rotational force applied by a manual wrench, a pneumatic wrench, an electric wrench, or any other suitable mechanical tool or power source. Additionally, power transfer mechanism 70 may linearly translate the received rotational force and apply it to threaded axis 60. In particular embodiments, the linear translation of force may cause threaded axis to move upward, thus pulling on gripping mechanism, causing seized component 30 to be removed from housing 20. In particular embodiments, power transfer mechanism 70 may be constructed of corrosion resistant steel. In general, however, power transfer mechanism 70 may be constructed of any appropriate material suitable to perform the described functionality.

Central shaft 80 is a tapered rod with a shoulder bolt that connects camlock mechanism 90 to gripping mechanism 40. In particular embodiments, central shaft 80 may be operable to pull upwards on gripping mechanism 40 when a user turns camlock mechanism 80. Additionally, in particular embodiments, central shaft 80 may be constructed of corrosion resistant steel. In general, however, central shaft 80 may include any appropriate elements formed in any appropriate shape suitable to perform the described functionality.

Camlock mechanism 90 securely fastens gripping mechanism 40 to seized component 30. In particular embodiments, camlock mechanism 90 may be a wedge mechanism attached to threaded axis 60, and attached to gripping mechanism 40 by central shaft 80. In particular embodiments, camlock mechanism 90 comprises two elements threaded onto threaded axis 60. The superior element is connected to the inferior element such that the line formed by their connection is at an angle relative to central shaft 80. When the superior element is turned, it moves upwards on the incline created by the angle, thereby pulling upwards on central shaft 80. As a result, turning camlock mechanism 90 pulls gripping mechanism 40 upward a calculated distance to provide proper clamping force on seized component 30.

Vibration mechanism 100 is attached to camlock mechanism 90 and applies a series of shocks or vibrations to system 10 as rotational force is applied to vibration mechanism 100. As described in detail with reference to FIGS. 2A and 2B, when rotational force is applied, mechanical vibration mechanism 100 moves a rotary plate with a cam positioned on its surface over a series of spring-loaded hammers. As the cam moves over each hammer, it compresses the hammer, so that when released, it strikes an impact plate, sending a vibration throughout system 10. In particular embodiments, pulling vibrations may be sent away from seized component 30. Depending on the configuration of vibration mechanism 100, vibrations may alternatively or additionally be sent downward toward seized component 30. Although FIG. 1 illustrates for purposes of example a single vibration mechanism 100, particular embodiments of system 10 may include any appropriate number of vibration mechanisms 90.

In operation, system 10 allows a user to conveniently and reliably extract seized component 30 from a housing. Gripping mechanism 40 securely attaches to seized component 30, and rotational force is applied to power transfer mechanism 70. As rotational force is applied, vibrations are emanated from vibration mechanism 100, which reverberate through system 10. The vibrations reach seized component 30 and housing 20 which loosen particulate matter and oxidation. The vibrations thus facilitate the extraction of seized component 30 from housing 20.

An example of this process, as implemented by a particular embodiment of system 10, is illustrated in FIG. 1. In particular embodiments, seized component 30 may include a rim or lip extending from housing 20 into which it is placed. Using support body 50, a user aligns system 10 over seized component 30. Pressing downward on support body 50, a user is able to attach system 10 to seized component 30.

System 10 may be securely attached to seized component 30 by attaching to the exposed rim or lip. In particular embodiments, system 10 may attach to seized component 30 by placing gripping mechanism 40 around, in whole or in part, the exposed rim or lip of seized component 30. In particular embodiments, gripping mechanism 40 may be a collet suitable to fit around an appropriately sized lip or rim of seized component 30. Thus, in particular embodiments of system 10 in which seized component 30 represents an antenna element, the antenna element may include a recessed cylindrical channel that is exposed when the antenna element is placed in housing 20. The exposed cylindrical channel enables gripping mechanism 40 to securely attach to seized component 30.

Camlock mechanism 90 is then utilized to fasten or tighten gripping mechanism 40 onto the rim of seized component 30. In particular embodiments, camlock mechanism 90 is composed of two elements threaded onto threaded axis 60. The superior element is connected to the inferior element such that their cross-section forms an angle. When the superior element is turned, it climbs up the incline created by the angle, thereby pulling upwards on the central shaft. Thus, user turns camlock mechanism 90 a quarter-turn, which pulls on a central shaft, which in turn pulls on gripping mechanism 40 upward a predetermined distance, securely tightening gripping mechanism 40 to seized component 30.

Once properly aligned and securely fastened to seized component 30, a user may apply rotational force to vibration mechanism 100. In particular embodiments, rotational force may be applied by a motorized drill attached to vibration mechanism 100. Rotational force may be supplied by any mechanical or electrical force, including a pneumatic, electrical or manual drill or driver. In general however, rotational force may be applied by any appropriate mechanism suitable to perform the described functionality. As rotational force is applied, vibration mechanism 100 applies a series of mechanical shocks or impulses to system 10. As discussed with respect to FIGS. 2A and 2B below, the rotational force applied to vibration mechanism 100 turns a rotary plate inside vibration mechanism 100 positioned on camlock mechanism 90. A cam, located on the rotary plate, contacts a series of spring-loaded hammers. As the cam contacts a spring-loaded hammer, it compresses the hammer, creating stored potential energy. As the cam moves off of the hammer, the hammer releases the stored potential energy in the form of kinetic energy. The hammer impacts a striking plate, positioned inside vibration mechanism 100. The vibrations caused by the spring-loaded hammer striking the striking plate reverberate through system 10, reaching seized component 30 and housing 20. As the rotational force continues, a series of vibrations is thus created. In particular embodiments, vibration mechanism 100 may include four spring-loaded hammers, so that vibrations are generated at four times the frequency at which rotational force is applied. The vibrations cause particulate matter, including oxidation and grime to loosen, thus facilitating the extraction of seized component 30.

Once seized component 30 is thus loosened from housing 20, a user may apply rotational force to power transfer mechanism 70. Rotational force may be applied by utilizing a wrench, a torque wrench, a pneumatic wrench, or any other appropriate device or tool suitable to perform the described functionality. In particular embodiments, rotational force may be applied in a clockwise direction. In general, the direction of rotational force applied may be configured differently in particular embodiments of system 10. Because power transfer mechanism is threaded onto threaded axis 60, power transfer mechanism is able to linearly translate the rotational force received to threaded axis 60. For example, if clockwise force is applied to power transfer mechanism 70, a counterclockwise reactionary force is supplied by support body 50, which remains stationary. Additionally, because power transfer mechanism 70 is prevented from moving downward on threaded axis 60 by support body 50, an upward force is created on threaded axis 60. Thus, the clockwise rotational force applied to power transfer mechanism 70 linearly translates onto threaded axis 60, which results in results in power transfer mechanism 70 pulling on threaded axis 60 towards a user and away from seized component 30. Since threaded axis 60 is attached to gripping mechanism 40, this results in seized component 30 being extracted outward from housing 20. In particular embodiments, a user may apply as few as one or two turns of rotational force before manually using support body 50 to extricate seized component 30 from housing 20.

By providing aligned, standardized, and repeatable extracting forces, system 10 provides a reliable and convenient method of extracting mechanical and electrical components that may be seized in their housings. System 10 thereby increases the successful removal rate of seized components. For example, alignment redundancies built into the design of system 10 ensure proper alignment and reduce damage caused by misalignment and non-repeatable force applications. Additionally, system 10 provides more contact surface for pulling on a seized component. As a result, a user may exert less force on a seized component, and increases the success rate of extraction by limiting the damage caused by an attempt to extract seized components by irregular methods and tools. Because forces are applied in a uniform and standardized way on seized components, a user is able to operate more quickly than by using other methods, thereby increasing the extraction rate. Additionally, system 10 is more flexible than other methods, because it may accommodate a variety of tools, including electric and pneumatic power. Additionally, only a small amount of leverage is utilized in system 10, thereby ensuring system 10 is accessible to many users. Moreover, the vibration mechanism ensures greater reliability of the system 10. The vibrations created by the vibration mechanism assist the user in extracting a seized component, reducing the rotational force needed, thereby reducing breakage. Since breakage is reduced, maintenance costs are correspondingly reduced. Thus, system 10 may provide numerous benefits. However, specific embodiments of system 10 may provide some, none, or all of these benefits.

Figure 2A:
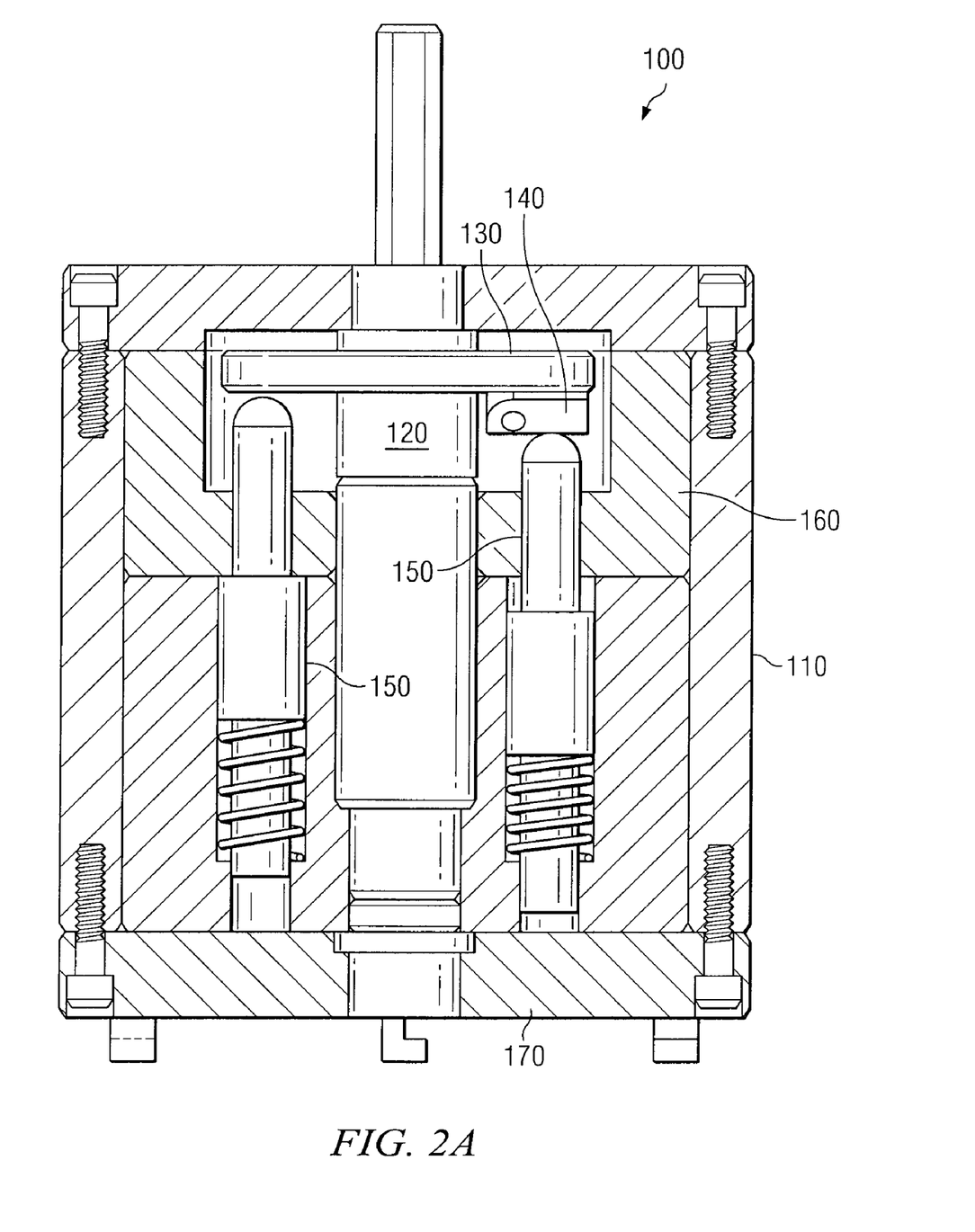
FIGS. 2A and 2B are block diagrams illustrating in more detail a particular embodiment of a vibration mechanism that may be utilized in the extraction system of FIG. 1.
Figure 2B:
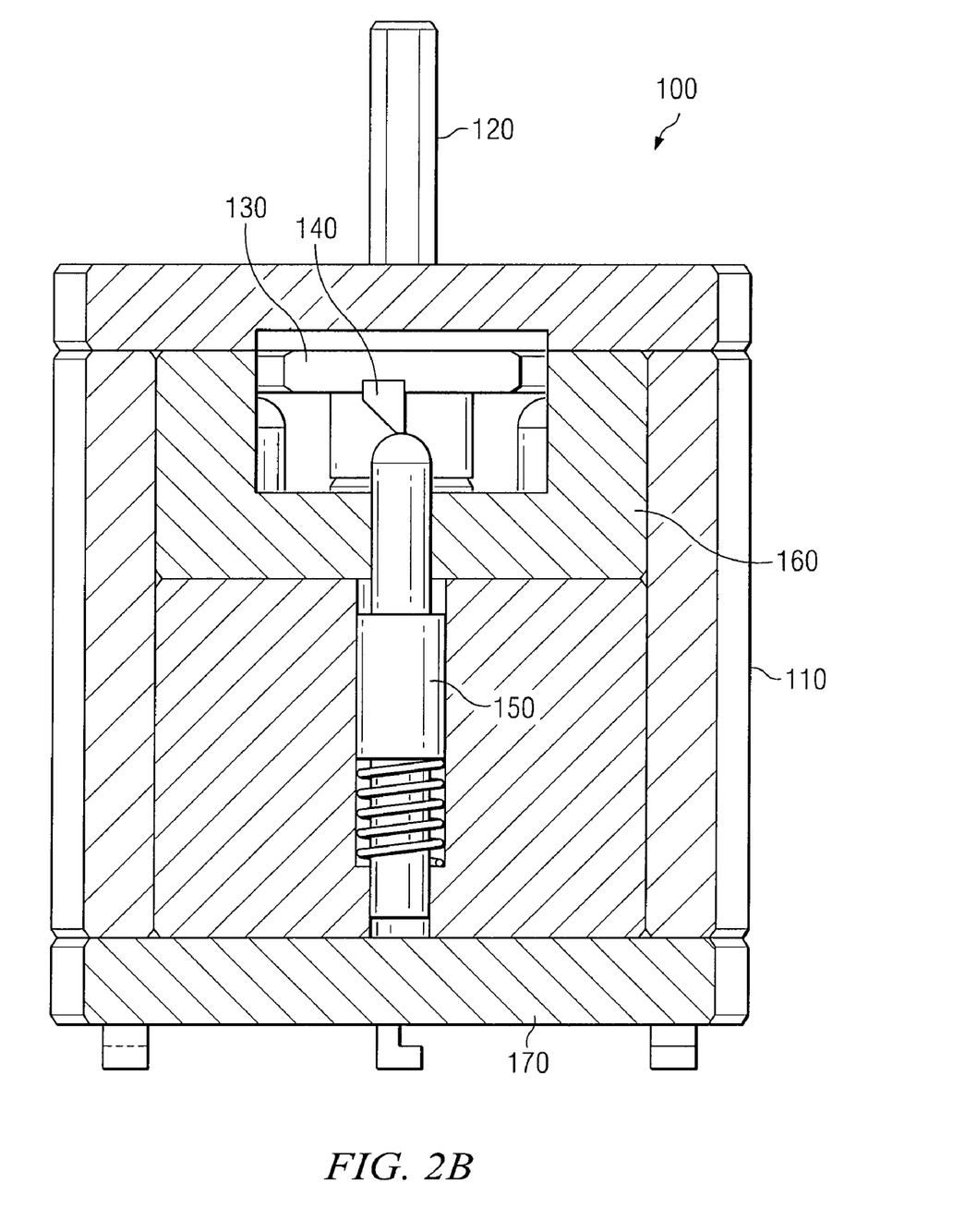

FIGS. 2A and FIG. 2B are block diagrams illustrating in greater detail particular embodiments of vibration mechanism 100 shown in FIG. 1. In general, as discussed with respect to FIG. 1, vibration mechanism 100 facilitates the extraction of seized component 30 by providing a series of vibratory forces that reverberate through system 10. The vibratory forces may loosen accumulated particulate matter and oxidation that cause components to seize. As shown in FIGS. 2A and 2B, vibration mechanism 100 may include a casing 110, a shaft 120, rotary plate 130, one or more cams 140, one or more spring-loaded hammers 150, a strike plate 160, and a bottom cover 170. As referenced in the following descriptions, FIG. 2A illustrates a frontal view of vibration mechanism 100 as the tapered face of cam 140 contacts a spring loaded hammer 150. FIG. 2B illustrates a side view of vibration mechanism 100 showing the tapered face of cam 140 contacting a spring-loaded hammer 150.

Casing 110 encloses, in whole or in part, the various components of vibration mechanism 100. In particular embodiments, casing 110 may be shaped in the form of cylinder, which encloses, in whole or in part, shaft 120, rotary plate 130, cam 140, spring-loaded hammers 150, strike plate 160, and bottom cover 170. In particular embodiments, casing 110 may be shaped in the form of a cylinder constructed from corrosion resistant steel. In general however, casing 110 may be constructed of any appropriate material shaped into any form suitable to perform the described functionality.

Shaft 120 provides structural support to various components of vibration mechanism 100 and transfers energy from an external source to one or more components of vibration mechanism 100. In particular embodiments, shaft 120 may be a hexagonal shaft operable to receive a rotational force supplied by a drill, wrench, driver, or any other appropriate source. Additionally, one or more components of vibration mechanism 100 may be attached through their centers to shaft 120. Although illustrated for purposes of example a single shaft 120, shaft 120 may represent one or more shafts connected or joined in any appropriate manner.

Rotary plate 130 is attached through its center to shaft 120 and accommodates one or more cams 140. As rotational force is applied to power transfer mechanism 70, or shaft 120, rotary plate 130 may rotate in the same direction as the rotational force. In particular embodiments, rotary plate 130 may receive an impact from spring-loaded hammers 150. Additionally, rotary plate 130 may be constructed of corrosion resistant steel. In general, however, rotary plate 130 may be constructed of any appropriate material suitable to perform the described functions.

Cam 140 is attached to rotary plate 130 and contacts one or more spring-loaded hammers 150. In particular embodiments, cam 140 may be positioned on the center edge of rotary plate 130. In general however, cam 140 may be positioned in any appropriate location on rotary plate 130 suitable to perform the described functionality. In particular embodiments, cam 140 may be tapered, so that as cam 140 contacts spring-loaded hammer 150, spring-loaded hammer 150 is compressed. As cam 140 rotates around on rotary plate 130, cam 140 may contact a series of spring-loaded hammers 150 in vibration mechanism 100, which provides shocks or vibrations through system 10. Although illustrated for purposes of example a particular embodiment of system 10 that includes a single cam 140, alternative embodiments may include any appropriate number of cams 140. Particular embodiments of system 10 may include additional numbers, sizes, or inclines of cams 140, enabling a user to vary the frequency and force of generated vibrations.

Spring-loaded hammer 150 is a spring that is enclosed, in whole or in part, by casing 110, and attached to bottom cover 170. In particular embodiments, spring-loaded hammer 150 may comprise a compression spring, a coil spring, or any other appropriate type of spring suitable to perform the described functionality. In particular embodiments, spring-loaded hammer 150 may be operable to impact strike plate 160. As noted above, as rotary plate 130 rotates, cam 140 contacts the top of spring-loaded hammer 150. Cam 140 causes spring-loaded hammer 150 to compress, creating potential energy. As cam 140 moves off of spring-loaded hammer 150, spring-loaded hammer 150 releases its stored potential energy in the form of kinetic energy and impacts strike plate 160. In particular embodiments, a wider portion of the casing of spring-loaded hammer 150 contacts strike plate 160, positioned in the center of vibration mechanism 100. In alternative embodiments of system 10, spring-loaded hammer 150 may be operable to impact rotary plate 130, or simultaneously strike rotary plate 130 and strike plate 160. Although FIGS. 2A and 2B illustrate for purposes of example four spring-loaded hammers 150, alternative embodiments of system 10 may include any appropriate number of spring-loaded hammers 150. Additionally, by varying the number and spacing of spring-loaded hammers 150, a user may vary the frequency of with which vibrations are generated.

Strike plate 160 is attached to shaft 120 parallel to rotary plate 130 and receives an impact from spring-loaded hammers 150. In particular embodiments, strike plate 160 may contain appropriately sized holes to receive a portion of spring-loaded hammers 150. Particular embodiments of system 10 may not include a strike plate 160, and spring-loaded hammers 150 may impact rotary plate 130 or other component of system 10. Additionally, strike plate 160 may be constructed of corrosion resistant steel. In general, however, strike plate 160 may be constructed of any appropriate material suitable to perform the described functions.

Bottom cover 170 is a cylindrical plate attached to casing 110 that anchors one or more spring-loaded hammers 150. In particular embodiments, vibration mechanism 100, may attach to camlock mechanism 90 by securing bottom cover 170 to camlock mechanism 90. In particular embodiments, bottom cover 170 may be partially or wholly enclosed by casing 110. In alternative embodiments of system 10, bottom cover may partially enclose a portion of casing 110.

Figure 3:
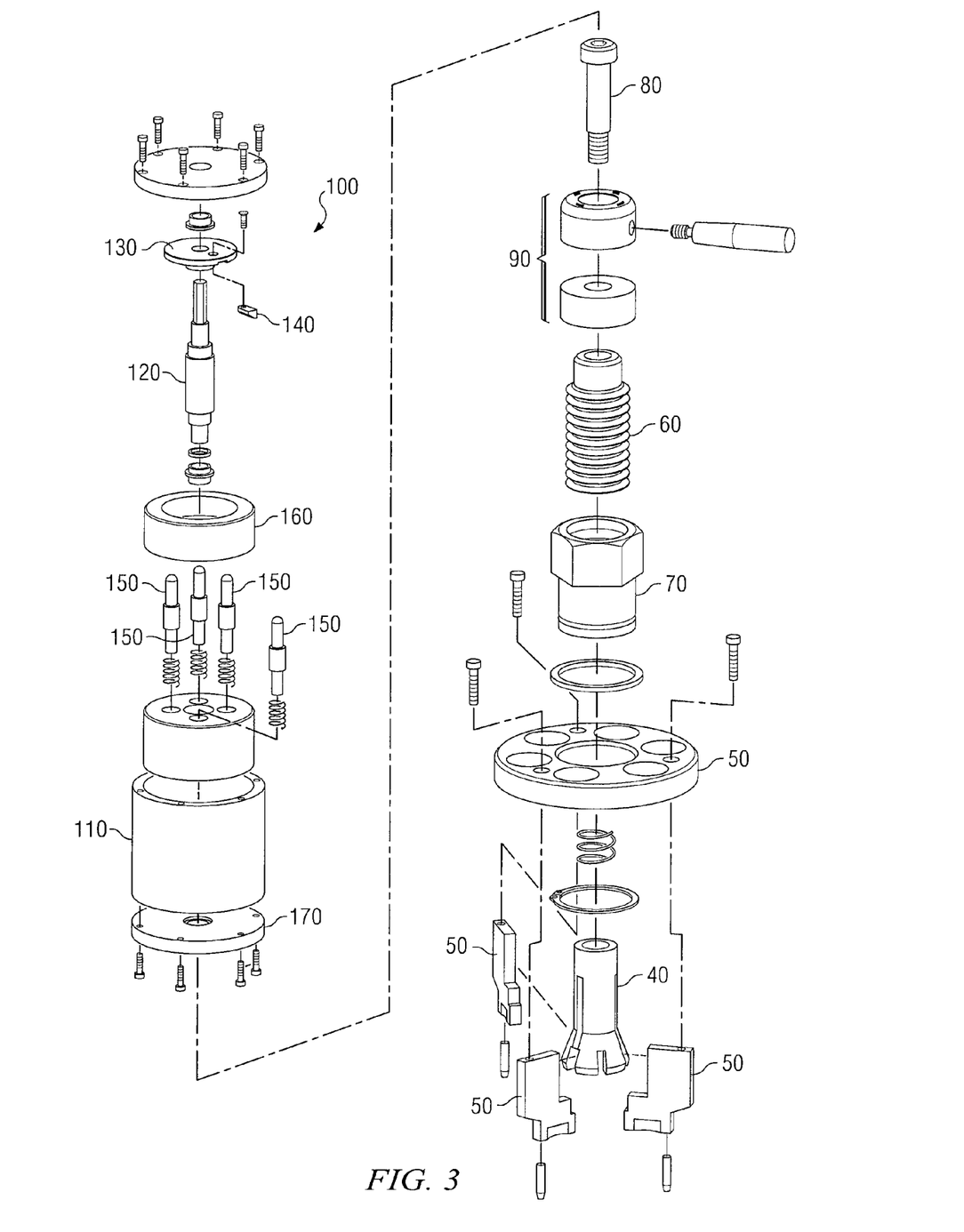
FIG. 3 is a block diagram illustrating an exploded view of a particular arrangement and/or combination of the vibration mechanism.

FIG. 3 is a block diagram illustrating an exploded view of a particular arrangement and/or combination of the components of system 10 as described in FIGS. 1, 2A and 2B. As discussed above, with particular reference to FIGS. 2A and 2B, vibration mechanism 100 comprises a casing 110, a shaft 120, a rotary plate 130, a cam 140, a plurality of spring-loaded hammer 150, a strike plate 160, and a bottom cover 170. In particular embodiments, vibration mechanism 100 may be attached to an upper surface of camlock mechanism 90. As shown in FIG. 3, a system 10 further comprises a central shaft 80, a camlock mechanism 90, a threaded axis 60, a power transfer mechanism 70, a support body 50, and a gripping mechanism 40. Although the components of system 10 are illustrated in FIG. 3 as arranged and combined in a particular manner, particular embodiments of system 10 may include components arranged, combined or assembled in any appropriate form or manner.

Figure 4:
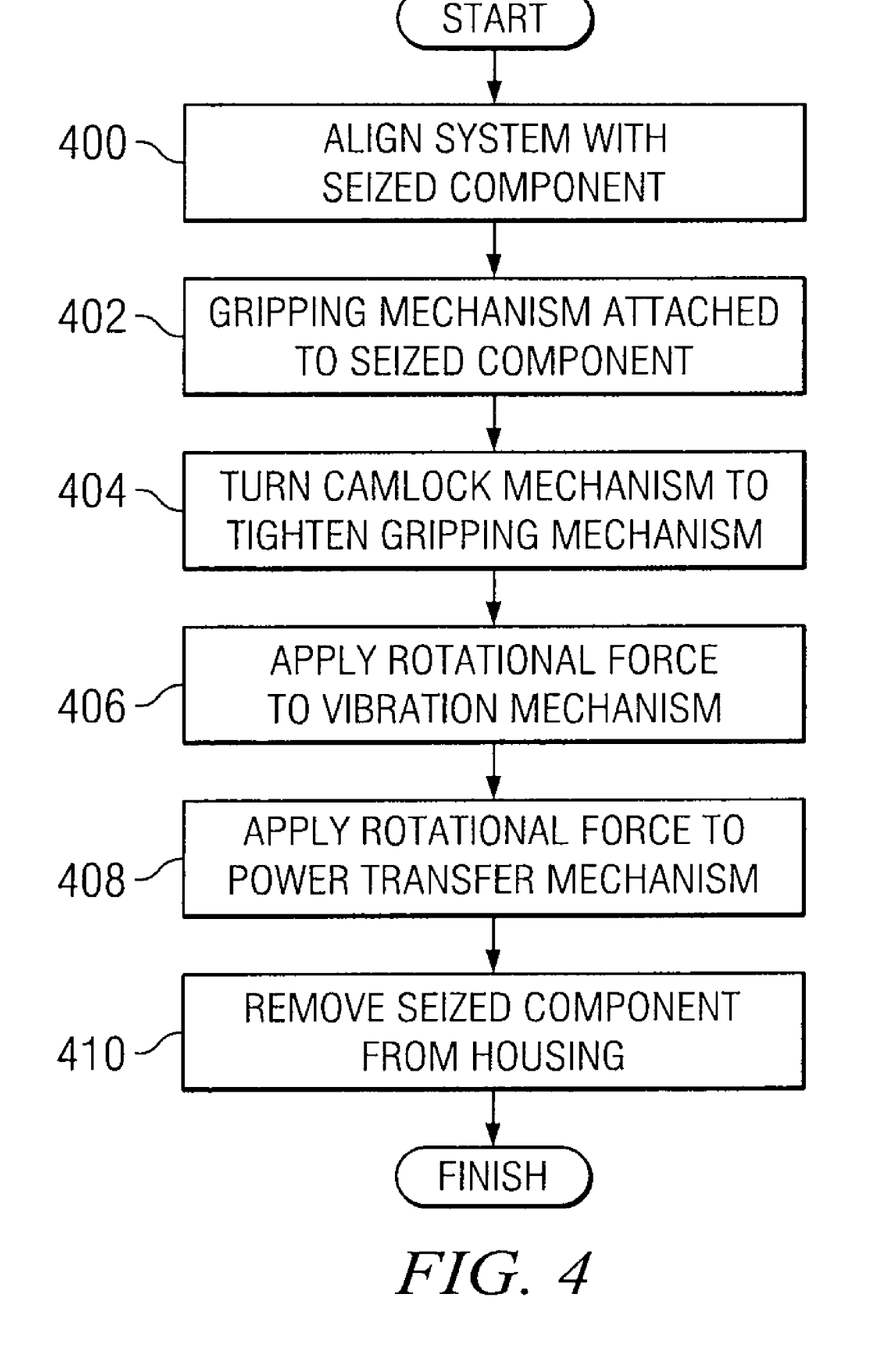
FIG. 4 is a flow chart illustrating an example operation of the extraction system shown in FIG. 1.

FIG. 4 is a flowchart illustrating operation of a particular embodiment of system 10 in extracting a seized component 30. The steps illustrated in FIG. 4 may be combined, modified, or deleted where appropriate, and additional steps may also be added to those shown. Additionally, the steps may be performed in any suitable order without departing from the scope of system 10.

Operation, in the illustrated example begins in step 400, with a user aligning system 10 over seized component 30. As noted with respect to FIG. 1 above, seized component 30 may include a rim or lip extending from housing 20 into which it is placed. Using support body 50, a user may utilize alignment pins on support body 50 to correctly position system 10 over seized component 30 for proper extraction.

In step 402 gripping mechanism 40 is attached to seized component 30. By pressing downward on support body 50, a user is able to attach system 10 to seized component 30. As discussed with respect to FIG. 1 above, gripping mechanism 40 may be a collet suitable to fit around an appropriately sized lip or rim of seized component 30. In particular embodiments, system 10 may attach to seized component 30 by placing gripping mechanism 40 around, in whole or in part, the exposed rim or lip of seized component 30. Thus, in particular embodiments of system 10 in which seized component 30 represents an antenna element, the antenna element may include a recessed cylindrical channel that is exposed when the antenna element is placed in housing 20. The exposed cylindrical channel enables gripping mechanism 40 to securely attach to seized component 30.

In step 404, camlock mechanism 90 is turned to fasten or tighten gripping mechanism 40 onto the rim of seized component 30. In particular embodiments, camlock mechanism 90 is composed of two elements threaded onto threaded axis 60. The superior element is connected to the inferior element such that the line formed by their connection is at an angle relative to the central shaft. When the superior element is turned, it climbs up the incline created by the angle, thereby pulling upwards on shaft 80. Thus, a user turns camlock mechanism 90 a quarter-turn, which pulls on central shaft 80, which in turn pulls on gripping mechanism 40 upward a predetermined distance, securely tightening gripping mechanism 40 to seized component 30.

In step 406, after proper alignment and fastening of system 10, a user may apply rotational force to vibration mechanism 100. Rotational force my be applied to shaft 120 on vibration mechanism 100 using a drill, driver, wrench or any other appropriate tool or device. As discussed with respect to FIGS. 2A and 2B above, the rotational force applied to shaft 120 turns rotary plate 130 inside vibration mechanism 100 positioned on shaft 120. Cam 140, located on rotary plate 130, contacts a series of spring-loaded hammers 150. As cam 140 contacts each spring-loaded hammer 150, it compresses spring-loaded hammer 150, creating potential energy. As cam 140 moves off of spring-loaded hammer 150, spring-loaded hammer 150 releases the stored potential energy in the form of kinetic energy. This results in spring-loaded hammer 150 impacting strike plate 160, also positioned on shaft 120. The vibrations caused by spring-loaded hammer 150 impacting strike plate 160 reverberate through system 10, and reach seized component 30 and housing 20. As the rotational force continues, a series of vibrations is created. The vibrations cause particulate matter, including oxidation and grime to loosen, thus facilitating the extraction of seized component 30.

Once particulate matter is loosened, rotational force may be applied to power transfer mechanism 70 in step 408. Rotational force may be applied by utilizing a wrench, a torque wrench, a pneumatic wrench, or any other appropriate device or tool suitable to perform the described functionality. In particular embodiments, rotational force may be applied in a clockwise direction. In general however, the direction of rotational force may be clockwise or counter-clockwise, depending on whether threaded axis 60 is right-handed or left-handed. Because power transfer mechanism 70 is threaded onto threaded axis 60, the force applied to power transfer mechanism 70 is linearly translated to threaded axis 60. For example, if clockwise force is applied to power transfer mechanism 70, a counter-clockwise reactionary force is supplied by support body 50, which remains stationary. Additionally, because power transfer mechanism 70 is prevented from moving downward on threaded axis 60 by support body 50, an upward force is created on threaded axis 60. Thus, in particular embodiments, the clockwise rotational force applied to power transfer mechanism 70 results in power transfer mechanism 70 pulling upwards, and towards a user, on threaded axis 60. Since threaded axis 60 is attached to gripping mechanism 40, this results in seized component 30 being extracted directly outward from housing 20. Once seized component 30 is thus loosened from housing 20, a user may continue to apply rotational force to power transfer mechanism 70 to continue extraction of seized component 30, or may manually use support body 50 to manually remove seized component 30 from housing 20.

In step 410, seized component 30 is removed from housing 20. A user may apply one or more turns of rotational force before manually using support body 50 to extricate seized component 30 from housing 20. The steps thus completed, a user may repeat the process to extract additional seized components 30.

Although the present invention has been described with several embodiments, numerous changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for extracting a seized component, comprising:
   a gripping mechanism operable to grasp a seized component;
   a camlock mechanism operable to secure the gripping mechanism to the seized component by displacing a shaft coupled to the camlock mechanism and the gripping mechanism;
   a vibration mechanism operatively coupled to the gripping mechanism to generate vibrations to loosen the seized component;
   a threaded axis connected to the gripping mechanism;
   a power transfer mechanism threaded onto the threaded axis and operable to translate the threaded axis upon receiving a rotational force to apply a force sufficient to cause the gripping mechanism to extract the seized component; and
   a support body to support the power transfer mechanism and provide reactionary forces to the power transfer mechanism.

2. The system of claim 1, wherein the vibration mechanism comprises:
   a shaft extending through the center of the vibration mechanism;
   a rotary plate connected to the shaft and operable to rotate about the shaft;
   a strike plate connected to the shaft and positioned parallel to the rotary plate, the strike plate operable to receive one or more spring-loaded hammers through holes in the strike plate, the one or more spring-loaded hammers being biased toward the strike plate and operable to impact the strike plate;
   a cam attached to the rotary plate, and upon rotation of the rotary plate the cam being operable to contact, displace, and release the one or more spring-loaded hammers to cause an impact with the strike plate; and
   a housing operable to enclose at least a portion of the shaft, the rotary plate, the strike plate, the plurality of spring-loaded hammers, and the cam.

3. The system of claim 2, wherein the rotary plate is operable to rotate about the shaft by receiving a rotational force applied to the shaft.

4. The system of claim 1, wherein the vibration mechanism is further operable to attach to the camlock mechanism.

5. The system of claim 1, wherein the camlock mechanism comprises:
   an inferior portion of a camlock mechanism;
   a superior portion of a camlock mechanism; and wherein:
   a latitudinal surface of the inferior portion and a latitudinal surface of the superior portion form, when connected, an oblique angle relative to each of the longitudinal sides of the inferior portion and the longitudinal sides of the superior portion; and wherein the superior portion of the camlock mechanism is operable to, when rotated, to exert a pulling force on the shaft connected to the gripping mechanism.

6. The system of claim 1, wherein the power transfer mechanism is operable to receive a rotational force and translate the rotational force to linear force.

7. An apparatus for extracting a seized component comprising:
a vibration mechanism operable to generate vibrations to loosen a seized component, the vibration mechanism comprising:
a shaft extending through the center of the vibration mechanism;
a rotary plate connected to the shaft and operable to rotate about the shaft;
a strike plate connected to the shaft and positioned parallel to the rotary plate, the strike plate operable to receive one or more spring-loaded hammers through holes in the strike plate, the one or more spring-loaded hammers being biased toward the strike plate and operable to impact the strike plate;
a cam attached to the rotary plate, and upon rotation of the rotary plate the cam being operable to contact, displace, and release the one or more spring-loaded hammers to cause an impact with the strike plate; and
a housing operable to enclose at least a portion of the shaft, the rotary plate, the plurality of spring-loaded hammers, and the cam.

8. The apparatus of claim 7, wherein the rotary plate is operable to rotate about the shaft by receiving a rotational force applied to the shaft.

9. The apparatus of claim 7, wherein the vibration mechanism further comprises:
an extractor operable to attach to the vibration mechanism, wherein the extractor comprises:
a gripping mechanism operable to grasp the seized component;
a threaded axis connected to the gripping mechanism;
a power transfer mechanism threaded onto the threaded axis and operable to move the threaded axis;
a camlock mechanism operable to secure the gripping mechanism to the seized component; and
a shaft connected to the camlock mechanism and the gripping mechanism.

10. The apparatus of claim 7, wherein the extractor is operable to attach to the vibration mechanism by attaching the camlock mechanism to the vibration mechanism.

11. The apparatus of claim 10, wherein the power transfer mechanism is operable to move the threaded axis by receiving a rotational force and translating the rotational force to linear force.

12. The apparatus of claim 7, wherein the camlock mechanism comprises:
an inferior portion of the camlock mechanism;
a superior portion of the camlock mechanism; and
wherein:
a latitudinal surface of the inferior portion and a latitudinal surface of the superior portion form, when connected, an oblique angle relative to each of the longitudinal sides of the inferior portion and the longitudinal sides of the superior portion; and
wherein the superior portion of the camlock mechanism is operable to, when rotated, to exert a pulling force on the shaft connected to the gripping mechanism.

13. A system for extracting a seized component, comprising:
means for grasping a seized component with a gripping mechanism;
means for securing the gripping mechanism to the seized component by displacing a shaft coupled to a camlock mechanism and the gripping mechanism;
means for generating vibrations to loosen the seized component with a vibration mechanism operatively coupled to the gripping mechanism;
means for exerting a pulling force on the gripping mechanism by a threaded axis connected to the gripping mechanism; and
means for moving the threaded axis by a power transfer mechanism threaded onto the threaded axis upon receiving a rotational force, to apply a force sufficient to cause the gripping mechanism to extract the seized component.

* * * * *